Figure 1:
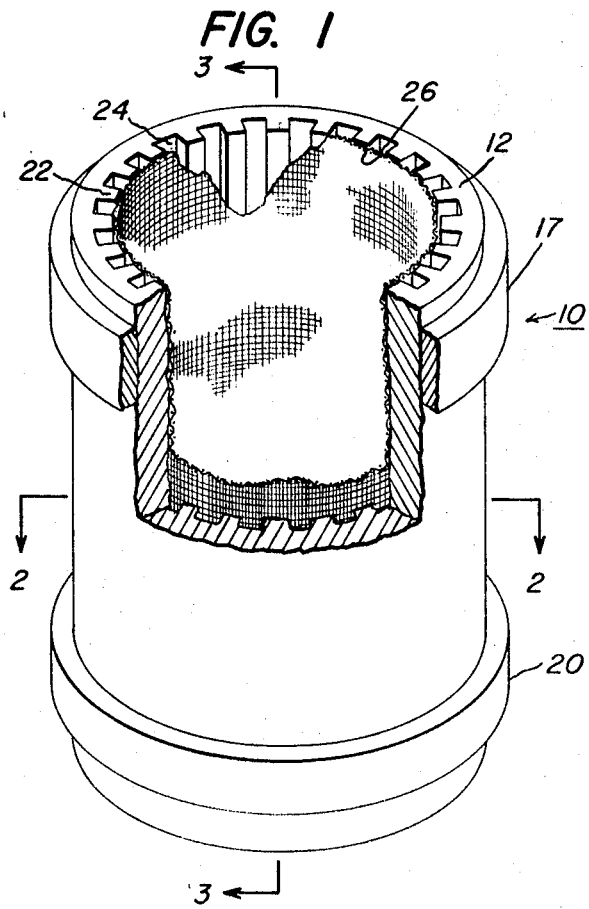

United States Patent

[11] 3,598,177

[72] Inventor Harold F. Webster
Scotia, N.Y.
[21] Appl. No. 771,426
[22] Filed Oct. 29, 1968
[45] Patented Aug. 10, 1971
[73] Assignee General Electric Company

[54] CONDUIT HAVING A ZERO CONTACT ANGLE WITH AN ALKALI WORKING FLUID AND METHOD OF FORMING
9 Claims, 5 Drawing Figs.

[52] U.S. Cl. .................................................... 165/1,
29/157.3, 165/105, 165/133
[51] Int. Cl. ............................................................ F28d 15/00
[50] Field of Search .......................................... 165/1, 105,
133; 29/157.3

[56] References Cited
UNITED STATES PATENTS
3,449,208 6/1969 Balent et al. ................ 176/92 X
2,763,570 9/1956 Shepard et al. ............. 165/133 X OTHER REFERENCES
Deverall, J. E. et al. High Thermal Conductance Devices..., Los Alamos Scientific Laboratory, Los Alamos, N. M. 4/1965, pp. pp. 1, 13 and 23, LA-3211

Handbook of Chemistry and Physics, 43rd ed. Cleveland, Ohio, Chemical Rubber Publishing Co., 1961 pp. 2596 to 2599, QD65C4C.8

Primary Examiner—Albert W. Davis, Jr.
Attorneys—Paul A. Frank, John F. Ahern, John J. Kissane, Frank L. Neuhauser, Oscar B. Waddell and Melvin M. Goldenberg ABSTRACT: A heat pipe capable of operation at temperatures above 900° C. is described characterized by an alkali metal working fluid contained within a conduit having a crystal face orientation only in selected planes to maximize the wetting between the sidewall and the working fluid. Preferably the conduit containing the working fluid is provided with a plurality of circumferentially disposed inwardly extending teeth overlayed with a thin wire mesh screen to define a plurality of capillary passages for liquid transport and the surface of the capillary passages contains the metal only in planes having work functions below a fixed value, e.g. 4.8 ev. for a sodium working fluid with the desired orientation of the capillary passage surface being formed by a hydrogen reduction of a metal fluoride. The zero contact angle between the working fluid and the conduit permit the initiation of operation of the heat pipe without prior warmup and eliminates localized "hotspots" destructive to the sidewall structure.

PATENTED AUG 10 1971

3,598,177

SHEET 1 OF 2

INVENTOR:
HAROLD F. WEBSTER,
by John J. Kissane
HIS ATTORNEY

PATENTED AUG 10 1971
3,598,177
SHEET 2 OF 2
FIG. 3
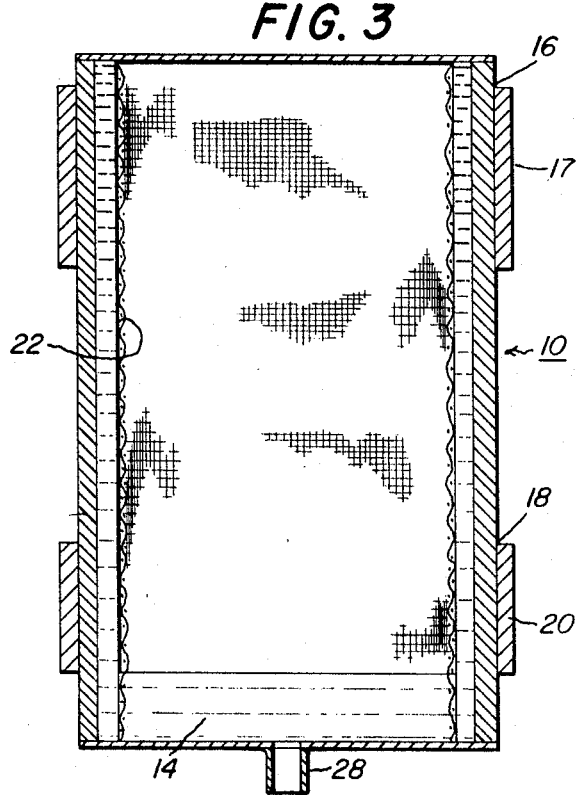
FIG. 4
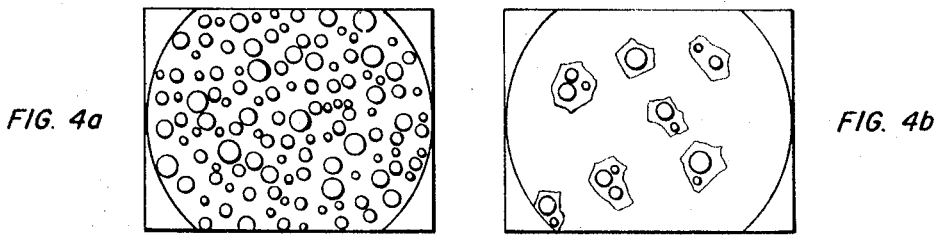
FIG. 4a   FIG. 4b
FIG. 5
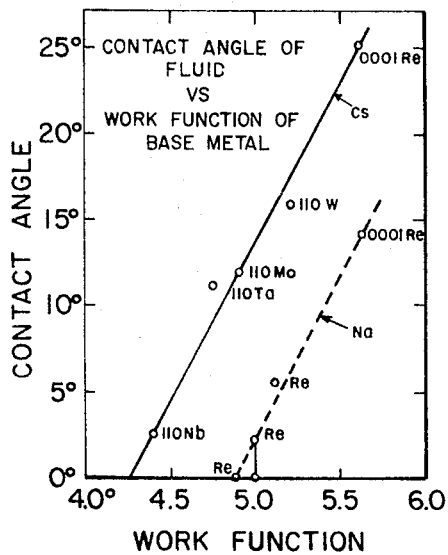
INVENTOR:
HAROLD F. WEBSTER,
by John J. Kissane
HIS ATTORNEY

CONDUIT HAVING A ZERO CONTACT ANGLE WITH AN ALKALI WORKING FLUID AND METHOD OF FORMING

This invention relates to a heat transfer conduit and a method of forming the conduit. More particularly, this invention relates to a heat transfer conduit having a crystal face orientation only in planes having a low work function to maximize the wetting of the conduit surface by an alkali metal working fluid contained therein. The invention herein described was made in the course of or under a contract or subcontract thereunder with the Department of the Air Force.

For thermal conduction of a heat flux to a working fluid through the fluid conduit to be operable at extremely high temperatures, the conduit should be completely wet by the fluid in order to inhibit an excessive localized temperature increase, or hotspot, destructive to the conduit. For example, in nuclear reactors cooled by pumping a liquid alkali metal, such as sodium, through conduits interlaced within the reactor, failure of the sodium to completely wet the conduit sidewalls can cause excessive localized heating of the uncontacted sidewall tending to boil away adjacent sodium thereby enlarging the dry sidewall site and precipitating a runaway condition. Similarly, in heat pipes commonly employed in zero gravity conditions for thermal transfer purposes, the failure of the working fluid to completely wet the container sidewall at temperatures below 25° C. has necessitated the utilization of auxiliary heating sources to uniformly raise the temperature of the entire length of the heat pipe to a level whereat wetting of the sidewall by the working fluid is sufficiently complete to permit the nondestructive application of the design heat flux to the pipe. The incorporation of an auxiliary heater into the heat pipe structure to assure wetting, however, not only is undesirable because of the inherent increase in the economic cost of the pipe but also because of the associated increase in weight which is of critical importance when the heat pipe is employed in space vehicles.

It is therefore an object of this invention to provide a heat transfer medium wherein a maximum wetting is obtained between the working fluid and the conduit at low temperatures.

It a further object of this invention to provide a low-cost, lightweight, high-efficiency heat pipe.

It is still a further object of this invention to provide a heat pipe capable of operation at temperatures in excess of 900° C.

These and other objects of this invention are achieved in a heat transfer medium wherein thermal transfer is effected by a fluid alkali metal heat transfer medium communicating two zones of diverse temperature by the fabrication of the fluid flow conduit surface contacting the alkali metal medium in a crystal face orientation only in those planes having a work function below 5.0 ev. When the fluid alkali metal employed in the heat pipe is sodium, the crystal face orientation of the fluid flow conduit desirably is in planes having a work function below 4.8 ev. to effect a zero contact angle between the alkali metal and the conduit while cesium requires a conduit interior having a crystal face orientation only in planes characterized by a work function below 4.3 ev. The refractory metals such as niobium, tantalum, molybdenum, tungsten and rhenium have crystal face orientations in certain planes exhibiting a sufficiently low working function to be completely wet by an alkali metal working fluid when deposited in a desired orientation and the tensile strength exhibited by these metals in conjunction with the high vapor pressure characteristic of the alkali metals permit the application of a heat flux to the pipe in excess of 900° C.

Figure 2:
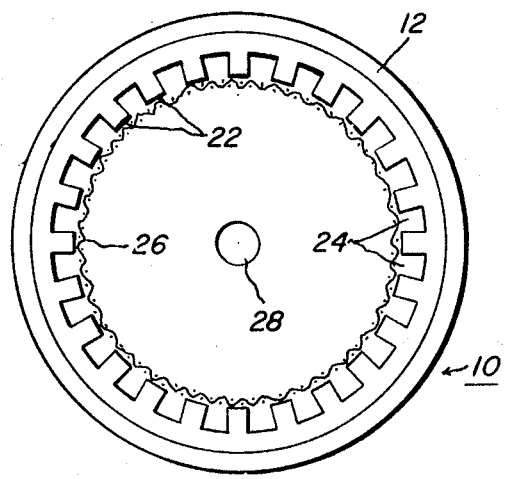

The novel features believed characteristic of the invention are set forth in the appended claims. The invention itself, together with further objects and advantages thereof may best be understood by reference to the following description, taken in connection with the accompanying drawings, in which:

FIG. 1 is a broken-away isometric view of a heat pipe constructed in accordance with this invention, FIG. 2 is a horizontal section of the heat pipe taken along lines 2—2 of FIG. 1, FIG. 3 is a vertical section of the heat pipe taken along lines 3—3 of FIG. 1, FIG. 4 is a pictorial illustration of sessile drops of liquid cesium on diverse tantalum surfaces, and FIG. 5 is a graph depicting the variation in the contact angle of cesium and sodium drops with the work function of the grains of the contacted metal.

A heat pipe 10 constructed in accordance with this invention is depicted in FIGS. 1—3 and generally comprises a cylindrically shaped conduit 12 containing an alkali metal working fluid 14 to communicate the evaporator 16, i.e. the portion of the heat pipe underlying a source of input heat flux such as a container of nuclear fuel 17 with the condenser portion 18 of the pipe whereat heat is removed by condensation of the evaporated alkali metal thereon. A thermionic converter, generally identified by reference numeral 20, circumferentially embraces the condenser portion of the pipe to convert the heat released upon condensation of the alkali metal to electrical energy.

The sidewall of conduit 12 preferably is thin, e.g. less than ¼-inch thick, to permit the rapid transmission of heat therethrough and the internal circumference of the conduit is provided with a plurality of circumferentially disposed teeth 22 extending the entire length of the heat pipe to define capillary pumping passages 24 for the alkali metal. Typically, the sidewall of conduit 12 is 30—40 mils thick and each of teeth 22 are approximately 40 mils square with a 40-mil spacing being provided between adjacent teeth to form the capillary passages. While the diameter of the conduit 12 can vary dependent upon the capacity of the heat pipe, an internal diameter of less than one-half inch generally is suitable for most purposes. A fly screen 26 typically having a pore diameter of 10 mils is brazed to each of teeth 22 along the entire length of the teeth to maximize the percentage of capillary passages 24 filled by the alkali metal working fluid.

In operation, heat generated by nuclear fuel container 17 is transmitted through the evaporator portion of conduit 12 underlying the container to the alkali metal within the portion of the capillary passages juxtaposed with the container thereby evaporating a portion of the alkali metal. The evaporated alkali metal passes through the pores of fly screen 26 to the interior of the pipe and subsequently condenses upon condenser portion 18 of the tube whereupon the released thermal energy is converted to electrical energy by thermionic converter 20 attached thereto. The condensed alkali metal in the molten state then returns through capillary passages 24 to the evaporator portion of the heat pipe and the cycle of evaporation and condensation is repeated.

Although any liquid capable of being converted to the gaseous state can be employed in the heat pipes of FIG. 1, the alkali metals of cesium, potassium, sodium and lithium generally are preferred because of the high heat of vaporization exhibited by these metals. Because of the low vapor pressure of sodium at high temperatures, e.g. at 900° C. sodium has a vapor pressure of approximately 1 atmosphere, and the compatibility of sodium with most metals, sodium is desirably employed for most applications. Lithium, on the other hand, tends to be relatively corrosive to certain metal conduits while cesium and potassium are characterized by slightly higher vapor pressures than sodium tending to make these metals less desirable for utilization in heat pipes.

The sidewalls of conduit 12 preferably are formed of a Group V or VI metal, e.g. tungsten, tantalum, niobium, molybdenum, etc. because of the superior wetting characteristics of these metals with the alkali metal working fluid and the mechanical strength exhibited by these metals. For example, a heat pipe having a ½-inch diameter, 40-mil thick niobium conduit can withstand an internal pressure of 6,400 p.s.i., i.e., the equivalent of 400 atmospheres of cesium permitting cesium within a ½-inch diameter niobium heat pipe to be raised to a temperature of 1,100° C. without exceeding the tensile strength of the conduit. Similarly, a ½-inch diameter heat pipe of tantalum is characterized by a tensile strength of 9,000 p.s.i. (or the equivalent of 500 atmospheres cesium) thereby allowing a ½-inch diameter tantalum heat pipe with a cesium working fluid to operate at temperatures well in excess of 1,100° C. Because the vapor pressures of sodium and lithium are significantly lower than the vapor pressure of cesium, heat pipes having a Group V or VI metal conduit and a sodium or lithium working fluid generally can operate at a significantly higher temperature than the 1,100° C. maximum operating temperature for a cesium working fluid in a niobium conduit.

In accordance with an important feature of this invention, the internal surface of metal conduit 12 contacting the working fluid has a crystal face orientation in planes characterized by a work function of less than 5.0 ev. to assure a maximum heat exchange between the alkali metal working fluid and the conduit. The variation of work function of a metal with crystal face orientation generally is a known phenomena and a number of known techniques can be employed to obtain a crystal face orientation only in those planes having a work function below a fixed value. For example, while polycrystalline tungsten is characterized by a plurality of (110) crystal faces having a work function above 5.0, tungsten crystals having a 100 orientation and a work function of 4.55 ev. can be vapor deposited upon the interior of conduit 12 by a hydrogen reduction of tungsten fluoride, e.g. $WF_6$. Desirably the molar ratios of hydrogen to tungsten fluoride is in a range between 6 to 1 and 30 to 1 and a pressure of 0.3 atmospheres is employed during the deposition to effect the desired crystal face orientation. Similarly, when cesium is employed as the working fluid thereby requiring a work function in the crystal grains of less than 4.3 ev. for a zero contact angle (as will be more fully explained hereinafter), a (100) niobium crystal orientation can be obtained along the interior of conduit 12 by vapor deposition techniques such as are disclosed in an article by I. Weissmann entitled "Research in Thermionic Emission System" Government Progress Report No. 3, Jan. 16, 1966 — 16 Apr. 1966. Similarly, tantalum and molybdenum films having a preferred crystal orientation in planes having a work function below 4.3 ev. can be vapor deposited by a hydrogen reduction of the metal fluoride to produce the desired crystal face orientation along the internal surface of conduit 12.

The importance of the crystal face orientation in the metallic conduit surface contacting the alkali working fluid is illustrated in FIG. 4 wherein the photographs of sessile drops of liquid cesium on the tantalum (110) crystal face (FIG. 4A) and polycrystalline tantalum (FIG. 4B) are shown. The tantalum (110) sheet having a work function of approximately 4.9 ev. was formed by the process described in U.S. Pat. No. 3,335,037, issued Aug. 8, 1967 in the name of C. G. Dunn et al. and assigned to the assignee of the present invention while the polycrystalline tantalum sheet was prepared by rolling. Both sheets were cleaned by flashing them to a temperature of approximately 2,000° C. within a sealed chamber at $1^1 10^{-9}$ torr whereupon cesium drops were deposited upon both sheets from breakable glass ampuls positioned within the chamber. Observation of the samples were made through a sapphire window and the contact angle of the drops on the metal sheets were measured by the technique described in my article entitled "Wetting by Cesium and Sodium and Its Relationship to Bare Work Function of the Substrate Metal" reported in the 1967 IEEE Conference Record of the Thermionic Conversion Specialists Conference Oct. 30 — Nov. 1, 1967, (the entire disclosure of which article is incorporated herein by reference). In this technique a telemicroscope and a pinhole light source are angularly disposed relative to the metal sheets such that light from the source reflected from the uncoated sheet is incident upon the telemicroscope. Upon subsequent observation of a cesium-coated portion of the tantalum sheet with the light source incident upon the periphery of the drop, the light reflection appears at the top of the cesium drop whereupon the pinhole light source is rotated at an angle such that the light reflection travels from the top of the drop to the drop periphery. The contact angle of the cesium drop upon the tantalum sheet is one-half the angle of rotation of the light source. Observation of the polycrystalline tantalum sheet of FIG. 4B disclosed about 80 percent of the sheet surface completely wet by the cesium. The remaining 20 percent of the polycrystalline tantalum surface was composed of tantalum grains having diverse contact angles up to 11° with the cesium drops. The (110) tantalum sample of FIG. 4A, however, disclosed no grains of the film completely wet by cesium and the drops on the grains had contact angles of approximately 11°. Similarly, cesium drops on a polycrystalline tungsten sample exhibited a variety of contact angles ranging from 17° to 0° with only 1 grain of the tungsten sample having a zero contact angle, i.e. wet completely, while a polycrystalline niobium sample had almost all the surface wet by the cesium except for a few grains having contact angles in excess of 2°. In general, the crystal face orientation in planes having work functions above 4.3 ev. exhibited a contact angle above 2° with the cesium drops while the crystal faces in planes having a work function below 4.3 ev. were completely wet.

The contact angle for cesium and sodium upon various crystal faces of niobium, tantalum, molybdenum, tungsten and rhenium plotted as a function of the work function of the crystal face is depicted in FIG. 5. As can be seen, the contact angle of cesium with the contacted metal sheet varies linearly with work function and intersects the abscissa, i.e. zero contact angle or complete wetting, at a work function of 4.3. Similarly sodium varies linearly with the work function of the crystal face of the contacting metal and a zero contact angle occurs only between sodium and those crystal faces of the contacted metal having work functions below 4.8 ev. Correspondingly, the wetting of a polycrystalline rhenium sample by potassium indicated the degree of wetting to vary with the grain face contacting the potassium and a single grain of rhenium exhibited a contact angle of 25° with cesium, 17.5° with potassium and 14° with sodium. The contact angle of the potassium upon the various grain faces of the rhenium film, however, appeared to decrease more rapidly than either the cesium or sodium curves of FIG. 5. Because of the higher ionization potential of lithium relative to the other alkali metals, lithium generally exhibits a zero contact angle only with crystal faces characterized by a work function below 5.0 ev.

It will be appreciated from the graphs of FIG. 5 that the crystal face of tungsten, molybdenum, tantalum, niobium and rhenium is of great importance in determining the wetting characteristics of the face by the alkali metal working fluid. Thus for complete wetting between the working fluid and the conduit, the conduit preferably should have at least an interior lining with a crystal face characterized by a work function below 5.0 ev. for a lithium working fluid, below 4.8 ev. for a sodium working fluid and below 4.3 ev. for a cesium working fluid. Although the desired orientation can be achieved by vapor deposition utilizing a hydrogen reduction of the metal fluoride (as has heretofore been described), other known methods of producing a crystal face orientation in a low work function plane, e.g. such as electrodeposition, also can be utilized.

Because the proper operation of heat pipe 10 requires that the pipe interior be free of undue contamination, prior to admission of the alkali metal to the heat pipe, an R.F. coil (not shown) is circumferentially disposed about conduit 12 and energized at a power level to raise the temperature of the conduit above the maximum operating temperature of the pipe e.g. above 1,400° C. During heating of the conduit, a $10^{-7}$ torr vacuum pump is connected to orifice 28 to exhaust baked-out gases from the heat pipe whereupon the orifice is sealed. The alkali metal employed in the heat pump then is decontaminated by distillation of the cesium from a first boule to a second boule with the condensation of the cesium in the second boule being controlled, e.g. by the temperature of a liquid coolant flowing about the boule, to assure the condensation only of cesium with occluded gases within the metal being released. After repeating the vaporization and condensation of the cesium to assure a desired purity, the cesium is condensed in a glass container (not shown) having a conventional mechanical glass breaker contained therein and the container is sealed off to inhibit contamination. The upper surface of the glass container then is communicated with orifice 28 and a magnet is employed to break the sealed portion of the cesium container whereupon heating of the cesium is initiated to transfer the cesium from the container to the heat pipe. Orifice 28 then is sealed off to produce a high-purity cesium content within the heat pipe 10.

What I claim as new and desire to secure by Letters Patent of the United States is:

1. A heat pipe for the transfer of heat between spaced-apart regions along said pipe comprising an enclosed conduit of a metal selected from the group consisting of niobium, tantalum, molybdenum, tungsten and rhenium, said conduit having an internal surface characterized by a crystal face orientation only in a plane having a work function below 4.3 ev., liquid cesium disposed within said conduit in thermal communication with the sidewalls of said conduit, means for applying a temperature above 800° to one region of said conduit to evaporate a portion of said cesium contacting said one conduit region, means for condensing said evaporated cesium upon a second region of said conduit and capillary means for pumping said cesium condensate from said condensing means to said evaporating means.

2. A heat pipe for the transfer of heat according to claim 1 wherein said conduit is niobium having a crystal face orientation only in the 100 plane.

3. A heat pipe for the transfer of heat between spaced-apart regions along said pipe comprising a conduit of a metal selected from the group consisting of tungsten, tantalum, rhenium and molybdenum, said conduit having an internal surface characterized by a crystal face orientation only in a plane having a work function below 4.8 ev., liquid sodium disposed within said conduit in thermal communication with the sidewalls of said conduit, means for applying a temperature above 800° C. to one region of said conduit to evaporate a portion of said sodium contacting said one conduit region, means for condensing said evaporated sodium upon a second region of said conduit, and capillary means for pumping said sodium condensate from said condensing means to said evaporating means.

4. A heat pipe for the transfer of heat according to claim 3 wherein said conduit is tungsten having a crystal face orientation only in the 100 plane.

5. A heat pipe for the transfer of heat between spaced-apart regions along said pipe comprising a conduit of a metal selected from the group consisting of tungsten and rhenium, said conduit having an internal surface characterized by a crystal face orientation only in planes having a work function below 5.0 ev., liquid lithium disposed within said conduit in thermal communication with the sidewalls of said conduit, means for applying a temperature above 800° C. to one region of said conduit to evaporate a portion of said lithium contacting said one conduit region, means for condensing said evaporated lithium for pumping said lithium condensate from said condensing means to said evaporating means.

6. A heat pipe for the transfer of heat according to claim 5 wherein said conduit is tungsten having a crystal face orientation only in the 100 plane.

7. A method of forming a conduit for the transmission of an alkali metal coolant comprising forming a metal conduit in a diameter capable of transmitting said metal coolant in sufficient quantities to transfer heat at the desired rate from an input heat flux, selecting a transition metal characterized by a plurality of crystal face orientations, said crystal face orientations having associated therewith work functions both above and below a threshold work function at which said alkali metal coolant forms a zero contact angle with a contiguous metal and depositing said transition metal upon the internal surface of said conduit to produce a crystalline face orientation only in a plane having a work function below said threshold work function.

8. A method of forming a conduit for the transmission of an alkali metal coolant according to claim 7 wherein said alkali metal coolant is lithium, said transition metal is tungsten and said deposition is accomplished by hydrogen reduction of $WF_6$.

9. A method of forming a conduit for the transmission of an alkali metal coolant according to claim 7 wherein said alkali metal coolant is cesium, said transition metal is a metal selected from the group consisting of tungsten and molybdenum, and said deposition is accomplished by a hydrogen reduction of the chosen metal fluoride.